ROBERT A. KIRBY INVENTOR.

ROBERT A. KIRBY INVENTOR.
ATTORNEY

United States Patent Office 3,386,285
Patented June 4, 1968

3,386,285
SYSTEM FOR MEASURING CHANGE
IN FLUID PRESSURE
Robert A. Kirby, Houston, Tex., assignor to Esso
Production Research Company, a corporation of
Delaware
Continuation-in-part of application Ser. No. 473,663,
July 21, 1965. This application June 7, 1967, Ser.
No. 644,220
5 Claims. (Cl. 73—152)

ABSTRACT OF THE DISCLOSURE

Automated, differential-pressure, sensing device adapted to be lowered within an oil well, including means for balancing the fluid pressure of a reference cell against the well pressure and metering fluid to-and-from the reference cell as required to maintain a balanced condition. The device includes an improved and simplified reference cell adapted to be charged with gas at the surface and lowered to the desired operating depth where it is vented to ambient pressure after establishing thermal equilibrium. The cell is then closed thereby establishing a reference pressure against which changes in reservoir pressure may be measured.

CROSS REFERENCE TO RELATED APPLICATION

This application is a continuation-in-part of copending U.S. application Ser. No. 473,663, filed July 21, 1965, now abandoned.

FIELD OF INVENTION

This invention is a device for measuring small changes in fluid pressure and is adapted for use in deep bore holes such as oil or gas wells.

SUMMARY OF THE INVENTION

This invention relates to the measurement of very small changes in fluid pressure, and more particularly to an automatic, remote-reading system for recording such changes as a function of time. In a preferred embodiment, the system is specifically adapated for use within deep bore holes, such as oil and gas wells, whereby a continuous record of down-hole pressure changes is obtained at the surface of the earth.

The system includes means for balancing the pressure of a reference cell against the pressure of the environment wherein small changes are to be continuously measured. The pressure of the reference cell is exerted against one fluid within a capillary tube, or other small bore diameter tube, while the pressure of the environment is exerted in the opposing direction against a second fluid within said tube which is substantially immiscible with the first fluid. Means are included to seek out and hold the interface formed by the two fluids. The latter means comprises a fully automated pump and valve assembly for transferring an accurately metered volume of fluid to or from the reference cell, as needed to compensate for changes in the pressure of the environment, thereby returning the interface to its null position. A continuous, cumulative record of the volume of fluid transferred to and from the reference cell is readily calibrated to provide the desired record of pressure changes.

The invention is particularly concerned with an improved method and apparatus for establishing an initial pressure within the reference cell which exactly equals the pressure of the environment wherein small pressure changes are to be measured, at the temperature of the environment. This accomplished, for example, when the system is to be used in deep bore holes, by first pressurizing the reference cell with nitrogen or other inert gas, at the surface of the earth, to a pressure at least slightly greater than the estimated absolute pressure to be encountered at the depth where differential measurements are to be made. The tool is then lowered to the desired operating depth, and is allowed to reach thermal equilibrium with the surrounding bore hole fluids. The reference cell is then vented, preferably at substantially the same depth as the pressure-sensing element of the system, whereby the pressure of the reference cell is exactly balanced with the bore hole pressure at the depth of the vent, at the temperature of the bore hole fluids. The vent is then closed, and the reference cell is ready to be placed in use by establishing fluid communication with the interface.

DESCRIPTION OF THE PREFERRED EMBODIMENT

Figure 1:
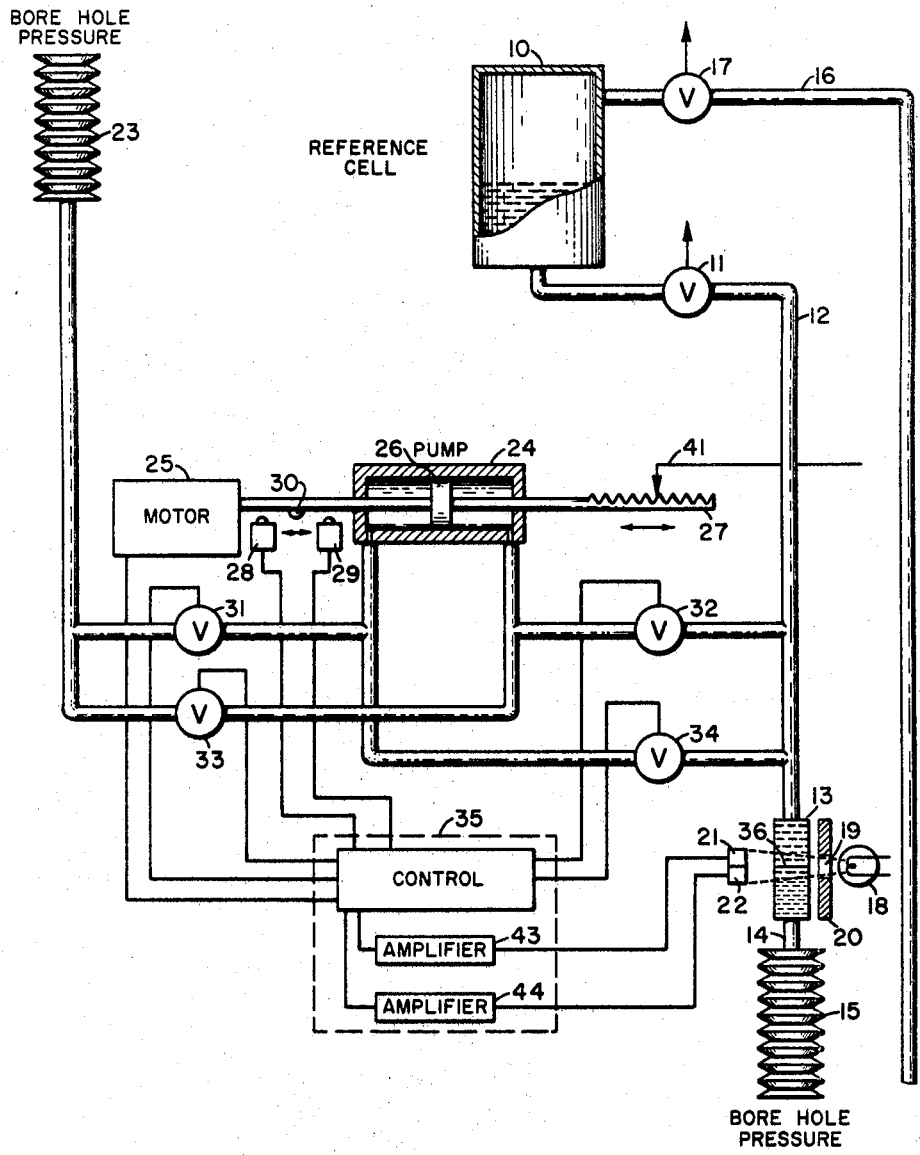
FIG. 1 is a schematic diagram showing the various elements and subcombinations of a preferred embodiment of the invention.

Referring to FIG. 1, the system of the invention includes reference cell 10 connected by means of a valve 11 and a conduit 12 with one end of the capillary tube 13. The opposite end of the capillary 13 is connected by means of a conduit 14 with a pliable, fluid-filled, membranous envelope 15. The reference cell is equipped with a discharge line 16 and a relief valve 17.

The system further includes light source 18 positioned to direct light through aperture 19 of shield 20. The light source and aperture are further positioned to direct light upon capillary 13 and to impinge any transmitted light upon one or both of photocells 21 and 22 as further explained below.

The system further includes a collapsible, fluid-filled reservoir 23 in combination with means for automatically transferring accurately metered volumes of the fluid to and from the reference cell in response ot the signals generated by photoelectric cells 21 and 22. The fluid transfer means includes positive displacement pump 24, driven by reversible D.C. motor 25. The position of piston 26 within the pump chamber is continuously indicated by variable resistance 27.

The positions of switches 28 and 29, respectively, determine the polarity of the current supplied to motor 25. The polarity of the current determines the direction of rotation of the armature of the motor, which in turn controls the direction of motion of piston 26. Cam 30 mounted on the pump shaft momentarily closes switch 28 when piston 26 has reached the lefthand limit of its stroke; then momentarily closes switch 29 as the piston reaches the right-hand limit of its stroke; and so on repeatedly. Switches 28 and 29 also reverse the position of the pump valves 31, 32, 33 and 34 as will be explained later.

Valves 31, 32, 33 and 34 control the transfer of fluid between reservoir 23 and reference cell 10. As will be seen in the explanation of the control center 35, the valves operate in paired coordination. When one valve of a pair is in a given position, open or closed, the other valve of that pair is in the same position. Valves 31 and 32 form one pair; valves 33 and 34, the other. Moreover, the two pairs of valves operate in opposed coordination. During operating of the system, one pair of valves is open and the other is closed. However, when the system is in a balanced state, both pairs of valves are closed to prevent fluid migration through the system.

Transfer of fluid between reservoir 23 and reference cell 11 is accomplished in the following manner. When piston 26 is moving from left to right, valves 31 and 32 are open, and valves 33 and 34 are closed, fluid is discharged from the right side of the pump through valve 32, conduit 12, and into reference cell 10. Concurrently, fluid is drawn into the left side of the pump through valve 31 from reservoir 23. When the piston reaches the right-hand limit of its stroke and begins to move from right to left, the position of the valve pairs is reversed by switch 29 and the control center 35, in a manner later described. That is valves 31 and 32 are closed and valves 33 and 34 are opened. With the piston moving from right to left and the valve positions reversed, fluid continues to be transferred from the reservoir 23 to the reference cell 10.

A reversal of valve positions also becomes necessary whenever the direction of bore hole pressure change reverses. For example, during a period of increasing bore hole pressure the valve positions are fixed to provide a transfer of fluids from reservoir 23 to reference cell 10. In the event the bore hole pressure begins to decrease rather than increase, interface 36 will move below the position shown in FIGURE 1, thereby causing both photocells 21 and 22 to be activated by light rays emanating from source 18, passing through capillary 13, and through the transparent or translucent fluid contained therein at the level of the photocells. In response to such activation, control center 35 reverses the position of each of valves 31, 32, 33 and 34.

The pressure is specifically adapted for use in an environment of high absolute pressure, such as normally found at substantial depths in oil and gas wells. However, only the electronics package must be built to withstand a high ratio of external to internal pressure. The remaining portions of the system need not be subjected to a high pressure differential, since it is convenient to flood the remaining portions of the system with a suitable fluid for equalizing external and internal pressures.

Initial preparation of the system is usually carried out at atmospheric pressure. This involves the setting of all valves to their closed positions, loading cell 10 with an inert gas to a pressure slightly above the initial pressure of the environment wherein pressure changes are to be measured, and filling the remaining portions of the system with suitable volumes of opaque and transparent (or translucent) fluids, respectively.

The opaque and transparent fluids which fill capillary 13 must be immiscible in order to form a stable interface 36. Additionally, for purposes of the system as illustrated in FIGURE 1, the opaque, or optically dense fluid must have a specific gravity somewhat greater than the specific gravity of the transparent fluid.

The system is then ready for lowering into a well to the depth at which pressure changes are to be measured. During the trip downhole, substantially the same pressure is exerted upon fluid reservoir 23 as is exerted upon membraneous envelope 15. Equal pressures upon these two portions of the system will prevent any substantial tendency of the two fluids to become intermixed or otherwise adversely distributed in the system. Similarly, the tendency of pressure-sensitive element 15 to become ruptured during the trip is substantially eliminated.

When the system has reached the level of interest, motor-driven valve 17 is opened by means of a control operated at the surface of the earth, which vents excess gas from reference cell 10 through line 16. When the pressure in cell 10 is thus equilibrated with the bore hole pressure, valve 17 is closed by a control operated from the surface, and valve 11 is opened, whereupon the system is ready to be placed on automatic control.

During automatic operation, only two signals are transmitted to the surface of the earth. One signal indicates the position of piston 26 within the chamber of pump 24, while the other signal indicates whether the bore hole pressure is increasing or decreasing. The pump position is indicated by variable resistance 27 or other means to indicate the relative position of the pump shaft. For example, variable resistance 27 is suitably coupled with a multivibrator circuit, the frequency of whose output depends upon the position of tap 41.

Rising bore hole pressure is characterized by a displacement of interface 36 toward the upper end of capillary 13. Such displacement of the interface places the opaque fluid between light source 18 and each of photoelectric cells 21 and 22. While the interface is so displaced, amplifiers 43 and 44 receive a reduced signal from the photocells. This information, transmitted to the surface of the earth, indicates rising bore hole pressure.

On the other hand, a decreasing bore hole pressure is characterized by the displacement of interface 36 toward the lower end of capillary 13. In this event, light from source 18 reaches both photoelectric cells 21 and 22 causing both amplifiers 43 and 44 to receive increased signals, which in fact is in turn transmitted to the surface of the earth to indicate decreasing bore hole pressure.

Since the volume of fluid metered by one stroke of piston 26 is accurately known, the number of strokes (or the fraction of a single stroke) completed during a single period of continuously increasing bore hole pressure is readily calibrated in units of pressure change. That is, the volume of fluid transferred by pump 24 during a period of increasing pressure represents the volume of fluid added to reference cell 10 necessary to compensate for the pressure change experienced within the well at the depth of pressure sensitive element 15.

As an example of materials which have been found suitable in the construction of the system illustrated in FIGURE 1, conduit 12 and all similar conduits are preferably rigid metal tubing, such as copper or stainless steel. Capillary 13 is preferably composed of a material having a high resistance to wettability or dyeing, in order to avoid the difficulties which would arise in the event the opaque fluid of envelope 15 should adhere to the capillary walls. Specifically, when interface 36 rises and later falls, it becomes apparent that any tendency of the opaque fluid to coat the walls of capillary 13 may cause one or both of the photocells to receive a false signal. "Teflon" tubing has been found especially suitable as a capillary material. Suitable translucent fluids include the light hydrocarbon oils, such as kerosene or naphtha, while India ink has been found suitable as an opaque fluid. Membraneous envelope 15 may suitably be composed of one mil "Mylar" plastic film, and the same is true of reservoir 23, although a somewhat thicker film may be used for the latter, since a lesser sensitivity to pressure change is satisfactory. A suitable matched pair of photoelectric cells is available from Texas Instruments, Incorporated, including, for example, their light sensor LS-221.

Figure 2:
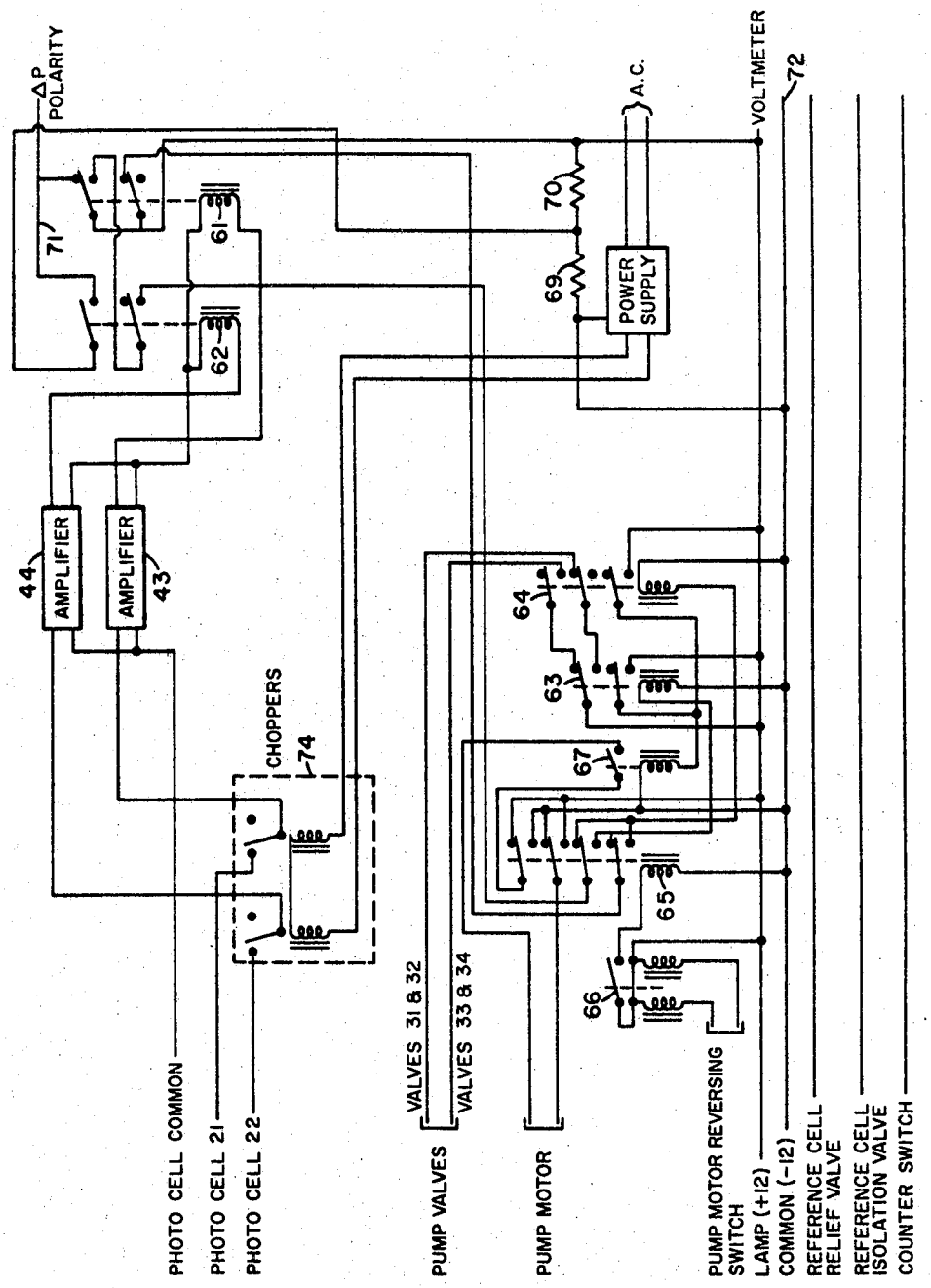
FIG. 2 is an electrical diagram, partly in schematic form, of the control system which operates the pump and valves in response to signals generated by the interface detection means.

In FIGURE 2, the details of control center 35 are shown, including relays 61 and 62 which receive signals from photocells 21 and 22, via amplifiers 43 and 44, respectively, the operation of the amplifiers being stabilized by choppers 74. The relaxed positions of these relays, as shown, corresponds to a position of interface 36 somewhat above its null point, sufficient to reduce the signal from cell 21 below a certain critical voltage, which is indicative of an increasing bore hole pressure. During periods of stable pressure, interface 36 remains at its null point, causing the generation of a signal by cell 21 sufficient to energize relay 61, while relay 62 remains in the open or relaxed position.

For a period of decreasing bore hole pressure, interface 36 falls to a level which permits increased light to strike cell 22, whereby both relays 61 and 62 are closed.

The logic developed by relays 61 and 62 is employed to control the direction of flow between reservoir 23 and reference cell 10. Direct control of the flow direction is determined by the positions of valves 31, 32, 33 and 34, as discussed in connection with FIGURE 1; however, the valve positions are controlled by relays 63 and 64. Relay 65 controls the polarity of current supplied to motor 25 and also connects relay 63 and 64 with the proper poles of relays 61 and 62 in response to signals received from relay 66. For example, the relaxed position of relay 61 completes a circuit connecting one pole thereof with the coil of relay 63, only when relay 65 is also in the relaxed position. When relay 65 is energized, the relaxed position of relay 61 connects one pole thereof with the coil of relay 64.

Latching relay 66 is actuated by the alternate momentary closing of switches 28 and 29 by cam 30 as discussed earlier. Specifically, when piston 26 reaches the right-hand limit of its stroke, relay 66 is closed, which in turn energizes relay 65, thereby reversing both the pump motor and the pump valves. Relay 66 remains closed and relay 65 remains energized until cam 30 momentarily closes switch 28, which in turn opens relay 66 allowing relay 65 to relax.

Relaxation of relay 67 disconnects the pump motor from its power supply, an event which occurs only when relay 61 is closed and relay 62 is open, a condition which indicates that interface 36 is holding at its null point.

Resistances 69 and 70 are employed in combination with the D.C. power supply to select a voltage indicative of rising bore hole pressure, and a different voltage to indicate decreasing bore hole pressure. Specifically, the difference in potential across leads 71 and 72 depends upon the positions of relays 61 and 62, as determined by the location of interface 36, discussed earlier. When the bore hole pressure is increasing the difference in potential across leads 71 and 72 is the difference between the voltage of the D.C. power supply and the common ground for the system. When the bore hole pressure is decreasing the differential across leads 71 and 72 is the difference between the voltage of the D.C. power supply and the common less the voltage drop across resistor 70. When the bore hole pressure is steady the circuit between lead 71 and the D.C. power supply is broken and no difference in potential between leads 71 and 72 is indicated by the voltmeter. In this manner, a voltage signal is obtained which is indicative of the pressure condition. This signal is transmitted to the surface and recorded, together with a signal to indicate pump position.

An example of the operation of the device under a specific set of conditions will further illustrate the operation of the invention. For the purpose of illustration, it is assumed that the pump piston 26 is moving from left-to-right and the pressure is increasing, as shown by condition I on the following chart. At the beginning of the left-to-right piston stroke, cam 30 trips switch 28 which breaks the circuit of relay 66, relaxing the relay. With relay 66 in its relaxed position, relay 65 is also relaxed. Under conditions of increasing pressure, the interface 36 rises above its null point and the opaque fluid obscures photocells 21 and 22. Since both photocells 21 and 22 are obscured by the opaque fluid, neither amplifier 43 nor 44 transmits a signal and therefore relays 61 and 62 are in their relaxed positions. With relay 61 and 62 in their relaxed position, the voltage differential between line 72 and 71 is indicative of an increasing pressure. With relay 61, 62 and 65 in a relaxed position, relay 63 is energized and relay 64 is relaxed. The closing of relay 63 energizes the circuit to valves 31 and 32, opening these valves and also completes the circuit to relay 67 thereby starting the pump motor. The pump transfers fluid into the reference cell until the pressure in the reference cell equals that of the environment and the interface 36 is returned to its null position. Then assuming the pump piston is still travelling from left to right at this time, the relays of the system assume the positions shown in condition V of the chart and will so remain until another pressure change occurs.

The following chart gives the relaxed or energized condition of each of the relays in the pump valve system under varying conditions:

| Condition | I | II | III | IV | V | VI |
|---|---|---|---|---|---|---|
| Well Pressure | Increase | Increase | Decrease | Decrease | Balance | Balance. |
| Piston Movement | Left to Right | Right to Left | Left to Right | Right to Left | Left to Right [1] | Right to Left.[1] |
| Relay 66 | Relaxed | Energized | Relaxed | Energized | Relaxed | Energized. |
| Relay 65 | do | do | do | do | do | Do. |
| Cell 21 | Off | Off | On | On | On | On. |
| Cell 22 | Off | Off | On | On | Off | Off. |
| Relay 61 | Relaxed | Relaxed | Energized | Energized | Energized | Energized. |
| Relay 62 | do | do | do | do | Relaxed | Relaxed. |
| Relay 63 | Energized | do | Relaxed | do | do | Do. |
| Relay 64 | Relaxed | Energized | Energized | Relaxed | do | Do. |
| Relay 67 | Energized | do | do | do | Energized | Do. |

[1] Direction of movement before coming to rest.

A continuous record of the position of piston 26 and the direction of flow between reservoir 23 and cell 10 is readily converted to a continuous record of differential pressure change, since the product of the gas volume and pressure in cell 10 is constant at a constant temperature.

The system also permits an accurate, reliable determination of absolute pressure to be made for an environment inaccessible to conventional gauges. For example, once the measurement of differential pressure changes in a given bore hole is completed, valve 11 is closed, while valve 17 remains closed, thereby trapping within cell 10 a fluid having a pressure which exactly equals the absolute down-hole pressure, at bore hole temperature. The system is then raised to the surface, and the temperature of cell 10 is adjusted to again equal down-hole temperature, as determined by conventional temperature measurement. Any conventional pressure gauge can then be used to obtain a reading which accurately and reliably reflects the down-hole pressure.

While certain specific embodiments have been disclosed, other variations within the scope of the appended claims will readily occur to those skilled in the art. Inert gases other than nitrogen are also suitable for use in the system.

What is claimed is:

1. A method for establishing a reference pressure in a device for measuring small changes in subsurface pressure and adapted for lowering within a wellbore which comprises pressurizing a cell to a pressure at least slightly higher than the ambient pressure at a subsurface location where pressure changes are to be measured; closing the cell; lowering the cell to the location; venting excess gas from the cell to establish ambient pressure within the cell; and closing the cell to establish a reference pressure within the cell against which changes in ambient pressure may be measured.

2. The method as defined by claim 1 further comprising allowing the cell to reach thermal equilibrium at the subsurface location prior to venting excess gas from the cell.

3. An improved system for measuring small changes in fluid pressure having a reference cell; a pressure-sensitive element; a small bore tube; means for establishing fluid communication between one end of said tube and said reference cell; means for establishing fluid communication between the other end of said tube and said pressure-sensitive element; means for establishing a fluid interface in said tube to indicate a balance of pressure between said reference cell and the fluid pressure of the external environment surrounding said pressure-sensitive element; means for maintaining a pressure balance by altering the fluid content of said reference cell in response to any displacement of said interface by a change in the fluid pressure surrounding said pressure-sensitive element wherein the improvement comprises means for selectively interrupting fluid communication between said one end of said tube and said reference cell; and vent means for fluid communication between said reference cell and said environment whereby fluid communication between reference cell and the tube may be selectively interrupted while pressure communication is established through the vent means between the reference cell and the environment to establish a reference pressure within the cell which is equal to environmental pressure.

4. The system as defined by claim 3 wherein the means for selectively interrupting fluid communication between said reference cell and said one end of said tube is a valve.

5. The system as defined in claim 3 wherein the outlet of said vent means and the pressure-sensitive element are located at substantially the same elevation.

References Cited
UNITED STATES PATENTS 3,247,712   4/1966   Johnson et al. _____ 73—152

DAVID SCHONBERG, *Primary Examiner.*

LOUIS R. PRINCE, D. O. WOODIEL, *Examiners.*